United States Patent

Moore

[11] Patent Number: 6,120,574
[45] Date of Patent: Sep. 19, 2000

[54] SLOW RELEASE FERTILIZER SPIKE

[75] Inventor: William P. Moore, Hopewell, Va.

[73] Assignee: LESCO, Inc., Rocky River, Ohio

[21] Appl. No.: 09/344,082

[22] Filed: Jun. 25, 1999

[51] Int. Cl.$^7$ .................................................. C05G 5/00
[52] U.S. Cl. ............................ 71/64.13; 71/61; 71/64.11; 71/33
[58] Field of Search ................................ 71/33, 61, 64.02, 71/64.05, 64.07, 64.11, 64.13; 428/2; 23/313 R

[56] References Cited

U.S. PATENT DOCUMENTS

| | | | |
|---|---|---|---|
| 3,057,713 | 10/1962 | Gessler | 71/64 |
| 3,933,458 | 1/1976 | Philipp | 71/27 |
| 4,014,675 | 3/1977 | Osburn | 71/28 |
| 4,063,919 | 12/1977 | Grano, Jr. | 71/11 |
| 4,851,027 | 7/1989 | Murayama et al. | 71/64.07 |
| 5,174,804 | 12/1992 | Rehberg et al. | 71/3 |
| 5,317,834 | 6/1994 | Anderson | 47/48.5 |
| 5,435,821 | 7/1995 | Duvdevani et al. | 71/28 |
| 5,741,521 | 4/1998 | Knight et al. | 424/488 |

*Primary Examiner*—Steven P. Griffin
*Assistant Examiner*—Elin A Warn

[57] ABSTRACT

An attrition resistant fertilizer spike composition, exhibiting a mechanical strength which allows the spike to be hammered unsupported into the soil without suffering damage, to provide an effective source of slow releasing plant nutrients to the soil. The composition comprises between 93 and 98 percent of particulate plant nutrient compounds containing one phosphate ion chemically combined with one divalent cation and one monovalent cation, including the compounds magnesium ammonium phosphate and magnesium potassium phosphate. The composition includes a coating of between 2 and 7 percent of thermoplastic adhesive with a softening temperature between 65 and 160° C. on the particles. The coated particles are formed into an attrition and shatter resistant spike shape, suitable for hammering into the soil, by pressing into a die at a temperature higher than the softening temperature of the thermoplastic adhesive and then cooling to a temperature lower than the softening temperature. A method of preparing these improved spikes is provided. In the method the thermoplastic adhesive is applied as an aqueous dispersion or emulsion along with a die lubricant prior to pressing the coated particles into a spike exhibiting a high degree of physical integrity.

12 Claims, No Drawings

SLOW RELEASE FERTILIZER SPIKE

FIELD OF THE INVENTION

This invention relates to the field of plant foods and more particularly to a new fertilizer composition which comprises strong, shatter and attrition resistant aggregates, or spikes, which release plant nutrients in a controlled manner over an extended period of time. The new fertilizer spike composition comprises one, or more, particulate monovalent divalent metal phosphates, a small amount of thermoplastic adhesive, and a smaller amount of oil, compacted to useful sizes and shapes.

BACKGROUND OF THE INVENTION

There are many reports in the prior art describing the aggregation of plant food particles to facilitate placement and release of nutrients in desired locations, and in some cases, at desired release rates.

In U.S. Pat. No. 3,150,955 the use of ureaformaldehyde polymers is reported as a source of slowly water soluble nitrogen for fertilizers. U.S. Pat. No. 3,502,458 teaches the use of a urea-formaldehyde thermoset resin as a binder in a fertilizer composition which contains fibrous particles, such as sawdust or peat moss, in addition to the sources of plant nutrients. The spike composition taught required a support member in the spike. U.S. Pat. No. 3,057,713 discloses a pointed stick of fertilizer which can be driven into the ground, made by binding together granulated sources of nitrogen, phosphate, and potassium with reaction product of fibrous asbestos and phosphoric acid. U.S. Pat. No. 3,647,416 discloses a cold chisel shaped product which does not employ resins but is formed by the extrusion of a composition containing a filler, such as petroleum coke, sand, clay, or coke breeze, and a binder formed by the reaction of inorganics magnesium oxide and phosphoric acid.

U.S. Pat. No. 4,348,218 discloses compression of a substantially homogeneous granular fertilizer mixture and a thermosetting binder composed of urea-formaldehyde resin to form a briquette, which is then cured into a drivable spike. The spike, when driven into the ground, fertilizes the immediate area at a slow, even rate. The urea-formaldehyde resin binder comprises between 5 and 15 percent by weight of the briquette.

U.S. Pat. No. 3,892,552 discloses a one-piece wedge-shaped spike of fertilizer source materials bound together by a cured thermoset resin, which functions best when a plastic cap is placed on top of it for hitting, while the spike is hammered into the ground. The thermoset resin cited in the disclosure is a urea-formaldehyde resin in a 10 percent by weight concentration.

The spikes of the prior art are all bound together by substantial amounts of hardened materials, such as asbestos fibers, petroleum cake, and thermoset resin. These hardened binders have limited resistance to attrition and shattering when they are hammered into the ground and require relatively large amounts of the binders to hold the spikes together.

The spikes of the prior art are not inherently controlled release materials and obtain some controlled release properties by the occlusion of soluble materials in the spike materials. Although urea formaldehyde polymers are known to be effective fertilizers, polymerization to a high strength thermoset plastic is well known to greatly reduce their effectiveness as fertilizers. Prior art spikes require substantial amounts of binding material, typically amounting to 10 percent or more.

OBJECTS OF THE INVENTION

It is an object of this invention to provide an improved fertilizer spike composition containing low concentrations of binder which will withstand the substantial attrition and shattering which normally occurs during shipping, handling, packaging, and use by driving into the ground.

It is a further object of this invention to provide an improved fertilizer spike composition exhibiting high concentrations of plant nutrients and low inert or binder concentrations.

It is a further object of this invention to provide a method whereby the improved spike composition may be effectively prepared.

It is a further object of this invention to provide thermoplastic adhesives which may be used in low concentrations to form attrition resistant plant food spikes which may be hammered unsupported into the ground.

It is a further object of this invention to provide die lubricants which enhance the effectiveness of the spike preparation.

It is a further object of this invention to provide a fertilizer spike composition which effectively releases useful amounts of plant nutrients nitrogen, phosphorous, and potassium throughout an extended period of time.

SUMMARY OF THE INVENTION

It has been discovered that small amounts of water insoluble thermoplastic adhesives may be used to cast particles of low solubility plant nutrient compounds containing one phosphate ion chemically combined with one divalent cation and one monovalent cation, and that these coated particles, when compressed into spike shapes at temperatures higher than the softening temperature of the thermoplastic adhesives, form, after cooling, fertilizer spikes which may be hammered unsupported into the soil without damage from attrition or shattering, and supply plant nutrients to the soil in an effective controlled release manner. A particularly effective composition of these improved fertilizer spikes includes a very small amount of a liquid die lubricant. It was also found that the thermoplastic adhesives could be most effectively applied to the particles of plant nutrient compounds as aqueous liquid mixtures such as dispersions or emulsions.

DETAILED DESCRIPTION OF THE INVENTION

The present invention is directed to an attrition resistant fertilizer spike composition exhibiting a shape and mechanical strength which allows it to be hammered, unsupported, into the soil without suffering damage, to provide an effective source of slow releasing plant nutrients to the soil.

This new fertilizer spike composition comprises between 93 and 98 percent of particles of plant nutrient compounds containing one phosphate ion chemically combined with one divalent cation and one monovalent cation. These phosphate compounds exhibit low water solubilities between 0.01 and 1.0 gram per 100 grams of water at 20° C. so that the spikes function effectively as slow release fertilizer.

In addition, it is necessary that between 2 and 7 percent of a thermoplastic adhesive, exhibiting effective adhesion to wet particulate plant nutrients, a solubility of less than 0.1 gram per 100 grams of water at 20° C., and softening temperature between 65 and 160° C., coating the surfaces of the individual particles of the plant nutrient compounds.

For effective use the coated particles are formed into an attrition and shatter resisting spike shape suitable for hammering into the soil, by pressing into a die at a temperature higher than the softening temperature of the thermoplastic adhesive, and then cooling to a temperature lower than the softening point.

Fertilizer spikes composed of plant nutrients other than divalent cation monovalent cation phosphates are less attrition and shatter resistant. Compositions containing more than 98 percent of these phosphates form spikes which exhibit a property of shattering when hammered into the soil. When the concentration of the thermoplastic adhesive coating concentration is higher than 7 percent the spikes become sticky in the die and the spikes produced do not have good physical integrity.

The softening temperature, sometimes referred to as the softening point, of a thermoplastic, is defined as the minimum temperature at which some flow will occur in the thermoplastic material without application of substantial force. Thermoset materials do not undergo softening once they have set, and therefore are not suitable for use in the instant composition.

There are a series of particulate plant nutrient compounds containing one phosphate ion chemically combined with one divalent cation and one monovalent cation which are especially effectively included in the instant composition. These compounds consist of magnesium ammonium phosphate, magnesium potassium phosphate, manganese ammonium phosphate, manganese potassium phosphate, zinc ammonium phosphate, ferrous ammonium phosphate, and ferrous potassium phosphate.

The instant fertilizer spike composition provides exceptional mechanical strength when the thermoplastic adhesive exhibits a softening temperature between 75 and 140° C.

It was found that plant micronutrients may be included as part of the plant nutrient particles if the amounts are limited to between 0 and 10 percent of the weight of the spikes. Plant micronutrients of the group consisting of iron humate, ferrous sulfate, zinc sulfate, manganous oxide, copper sulfate, and sodium borate may be effectively included in the composition.

Although a wide variety of thermoplastic adhesives which provide the required softening temperatures, low water solubilities, and adhesion to wet plant nutrient particles may be used in the instant composition, best results are obtained when the thermoplastic adhesive is selected from the group of thermoplastic resins consisting of vinylidene chloride, 2-ethylhexyl acrylate, acrylic acid, vinyl acetate, butadiene, natural rubber, and combinations of the foregoing resins.

The inclusion of a liquid die lubricant in the spike composition improves the physical integrity of the spike and therefore improves its effectiveness. The composition is improved when it contains a liquid die lubricant, amounting to between 0.1 and 0.5 percent of the composition. Effective liquid die lubricants are vegetable oils, mineral oils, lignin sulfonate solutions, polyethylene glycols, and polyethylene glycol ethers.

The composition is particularly effective when the thermoplastic adhesive is applied to the particles of plant nutrient compounds as an aqueous emulsion, or dispersion, containing between 30 and 70 percent water before the spike is formed, so that the amount of emulsion, or dispersion, provides free moisture contents in the spike amounting to between 1 and 7 percent. Higher, or lower, free moisture contents detract from the spike integrity.

It was found that a spike is most suitable for hammering into the soil when in the shape of an elongated piece, with one flat end for hammering, and the other an acute angle end for penetrating the soil. There is no need for the elongated piece to be in any particular shape. The size may be widely varied to fit the need to fertilize a wide variety of plants and plant sizes. Small spikes may be used to fertilize small flowers in pots, and large spikes to fertilize very large outdoor trees.

The spike composition is most effective when the plant nutrient particles coated with the thermoplastic adhesive are charged into a spike shaped die, where temperatures are higher than the softening temperature of the thermoplastic adhesive, and pressure between 1500 and 2500 pounds per square inch are applied, to form the spike, which are then cooled below the softening temperature.

A four-step method has been discovered of preparing an attrition and shatter resistant fertilizer spike exhibiting a shape and mechanical strength sufficient to allow the spike to be hammered, unsupported, into the soil without suffering damage, to provide a source of slow releasing plant nutrients to the soil.

For the new method to be effective in producing these new and improved spikes, four steps must be performed. First, particles of plant nutrient compounds containing one phosphate ion chemically combined with one divalent cation and one monovalent cation, exhibiting a solubility of between 0.01 and 1.0 gram per 100 grams of water at 20° C., are sized, so that more than 80 percent of the particles exhibit diameters between 0.5 and 5.0 millimeters.

The sized particles amounting to between 93 and 98 percent of the weight of the spike are mixed and rolled in a coating device and sprayed with an aqueous emulsion or dispersion containing between 30 and 70 percent of a thermoplastic adhesive until the particles have been coated with thermoplastic adhesive amounting to between 2 and 7 percent, and the free moisture amounts to between 1 and 7 percent of the weight of the spike.

The coated particles are injected into a spike shaped die at a pressure between 600 and 4000 pounds per square inch and a temperature higher than the softening temperature of the thermoplastic adhesive and between 50 and 200° C. to form the particles into a fertilizer spike exhibiting the shape and mechanical strength sufficient to allow hammering while unsupported into the soil without suffering damage.

The fertilizer spike is discharged from the die and cooled to a temperature less than the softening point of the thermoplastic adhesive.

The instant method performs well when the particles of plant nutrient compounds are selected from the group consisting of magnesium ammonium phosphate, magnesium potassium phosphate, manganese ammonium phosphate, manganese potassium phosphate, zinc ammonium phosphate, ferrous ammonium phosphate, ferrous potassium phosphate, and mixtures thereof.

The method operates with the aqueous emulsion, or dispersion, preferably containing between 40 and 60 percent of a thermoplastic adhesive consisting of vinylidene chloride, 2-ethylhexyl acrylate, acrylic acid, vinyl acetate, butadiene, natural rubber and combinations thereof. These adhesives, although quite insoluble in water, exhibit an ability to adhere to, and to bond with, wet or damp plant nutrient particles.

The particles are preferably coated with thermoplastic adhesive in an aqueous dispersion amounting to between 2.8 and 3.0 percent of the weight of the spike.

The instant method is effective when a liquid die lubricant, exhibiting viscosities between 10 and 300 centipoise at 20° C., and amounting to between 0.1 and 0.5 percent, is added to the coated particle before injecting into the spike shaped die.

The preferred liquid die lubricants are vegetable oils, mineral oils, lignin sulfonate solution, polyethylene glycols, and polyethylene glycol ethers.

The spike shaped die refers to a die which causes coated particles to be shaped into an individual aggregate shaped in the form of a spike. It may actually have the same shape as a spike, be filled by pressing the particles into the spike shape, and then discharged. It may be a shaped die through which the particles are pressed so that they emerge as a continuous strand which is then cut to provide spikes with the desired flat end for hammering and an acute angle end for penetrating the soil. Therefore, the method is effective when the spike shaped die consists of an orifice in a continuous extruder through which the coated particles are pressed to form strands which are cut into spike shapes, and it is equally effective when the spike shaped die consists of an indentation in a rotary roll compactor, with the indentations being filled with the coated particles, compressed, and discharged as individual spikes.

In the preferred form of the instant method of preparing an attrition and shatter resistant slow release fertilizer spike, which may be hammered into the soil without suffering damage, the following steps are required.

Granules of plant nutrient compound, magnesium ammonium phosphate or magnesium potassium phosphate are sized so that more than 80 percent of the particles exhibit diameters between 0.5 and 5.0 millimeters. Particles outside this size range seriously reduce the quality of the spikes. Large amounts of fines are particularly deleterious.

The sized granules amounting to between 95 and 98 percent of the weight of the spike are mixed and rolled in a coating device where an aqueous liquid exhibiting a viscosity between 20 and 150 centipoise at 20° C. and containing between 40 and 60 percent of a thermoplastic adhesive resin composed of about equal parts of vinylidene chloride, acrylic acid, and 2-ethylhexyl acrylate is sprayed onto the granules until the granules are coated with thermoplastic adhesive amounting to between 2.8 and 3.2 percent.

It is preferred to hold the coated granules at ambient temperatures for a period of time between 1 and 24 hours to allow the thermoplastic adhesive to complete its adhesion to the granules of plant nutrient. Although not required, this hold period provides some surface drying and hardening of the surfaces on the granules, which allows easier feeding of the coated granules into the spike shaped dies.

Preferably, between 0.2 and 0.4 percent of a liquid vegetable oil, or mineral oil, die lubricant, exhibiting a viscosity between 20 and 150 centipoise at 20° C. is admixed with the coated granules. The coated granules, containing the die lubricant, are injected into a spike shaped die, and a pressure of between 1500 and 2500 pounds per square inch is applied at a temperature between 90 and 120° to the granules to form them into a fertilizer spike exhibiting the shape and mechanical strength sufficient to be hammered unsupported into the soil without attrition or shattering. The term hammering into the soil means driving the spike into the soil by hitting with a device, such as a hammer, mallet, or similar device normally used to drive stakes, pegs, or similar objects.

It is preferred to discharge the fertilizer spike from the spike shaped die and cool to a temperature of less than 60° C. to provide a spike with high physical integrity.

MODE OF OPERATION OF THE INVENTION

Having described the basic concepts of the instant invention, reference is now made to the following examples which are provided to illustrate the efficacious composition of this invention and the method for its preparation.

EXAMPLE 1

This example is provided to demonstrate the attrition resistance, mechanical strength and the ability of the spike composition of the instant invention to be hammered into the soil without suffering damage.

A fertilizer spike was selected, composed of 96.7 percent granular plant nutrient compound, magnesium ammonium phosphate, which was sized so that 93 percent of the granules had diameters between 0.5 and 5.0 millimeters. The solubility of the commercial magnesium ammonium phosphate used was 0.07 gram per 100 grams of water at 20° C. The granular plant nutrient compound was coated with 3.0 percent of 45 percent aqueous dispersion of a thermoplastic adhesive which had a solubility of less than 0.1 gram per 100 grams of water at 20° C. and a softening temperature of 91° C., and composed of about equal parts of vinylidene chloride, acrylic acid and 2-ethylhexyl acrylate.

The coated particles composition was formed into elongated rods, 3 centimeters in diameter and 14 centimeters long, with one end flat and the other cut off at a 30° angle.

Four of the spikes were hammered into the clay soil surrounding a 20 foot high apple tree in an orchard with a 1 pound hammer without damage to the spikes from attrition or shattering.

EXAMPLE 2

This example is provided to demonstrate the effective slow release of plant nutrients to the soil from the composition of the instant invention.

The spikes of Example 1 were analyzed as follows:

| Component | Wt % |
| --- | --- |
| Total N | 7.6 |
| CWIN | 6.3 |
| Total $P_2O_5$ | 38.7 |
| Citrate Soluble $P_2O_5$ | 21.3 |
| Total $K_2O$ | 0.0 |
| Total Mg | 13.5 |
| EDTA Soluble Mg | 11.1 |

In release tests run in triplicate, a single spike was placed in a 12 inch diameter pot filled to a depth of 8 inches with a 50—50 mixture of sand and peat moss. The pots were filled with water to the top of the soil on Monday, Wednesday, and Friday mornings and allowed to drain naturally between water floodings. The water drained was periodically analyzed to determine N, P, and Mg over a six month test period with the results tabulated as follows:

| | PPM in Water | | | |
| --- | --- | --- | --- | --- |
| Components | 1 week | 1 month | 3 months | 6 months |
| N | 28 | 15 | 10 | 7 |
| $P_2O_5$ | 45 | 30 | 12 | 8 |
| Mg | 14 | 8 | 7 | 6 |

The water elution tests show that the spikes are still providing nutrients to the soil after 6 months, and that no large initial discharge of nutrients was experienced.

EXAMPLE 3

This example is provided to demonstrate the preferred method of preparing the fertilizer spike composition of this invention.

Magnesium potassium phosphate granules amounting to 96.75 percent of the weight of the spike were screened to provide granules, 87 percent of which had diameters between 0.5 and 5.0 millimeters. The sized granules were charged batchwise to a coating pan and there spray coated with Daratak 3611 a dispersion in water of vinylidene chloride-acrylic acid-2-ethylhexyl acrylate resin. Viscosity of the aqueous dispersion was 70 centipoise at 20° C. The three thermoplastic components were present in about equal amounts, totaling 45 percent of the dispersion with the remaining 55 percent water. The Daratak was spray coated on the granules until the coating amounted to 3.0 percent of the final weight of the spike. The coating operation was carried out at ambient temperature without the addition of catalysts.

The coated granules were discharged from the coater into a storage bin and left there for a period of 18 hours to allow the bond between the thermoplastic Daratak 3611 and the magnesium potassium phosphate to cure.

The coated granules were charged for spike formation through an auger. In the auger, soybean vegetable oil with a viscosity of 105 centipoise at 20° C., amounting to 0.25 percent of the final spike weight, was sprayed onto the coated magnesium potassium phosphate granules at ambient temperature to provide lubrication to the spike forming dies and facilitate consistent feeding of the granules into the dies and the discharge of the spikes therefrom.

The spikes were formed in a double roll compactor where the coated lubricated magnesium potassium phosphate granules were forced into dies which were spike shaped indentations or pockets, in two hardened steel rollers rolling in the same direction in contact with each other. The rolls were operated so that they created a pressure of 2500 pounds per square inch on the granules which had been forced into the indentations between the rollers. The compression of the granules created a temperature of 115° C. in the spikes formed, which was above the softening point of the thermoplastic coating. The softened thermoplastic strongly bond the granules into the spike shape. The spikes were discharged at the point where the rollers were no longer in contact, and were cooled to a temperature of 40° C. by a stream of cooling air blowing through the perforated product belt conveyor.

The spikes formed were almost rod shaped, about 2.5 centimeters in diameter, and 7.5 centimeters long. One end was flat for hammering and the other end exhibited an angle of about 45 degrees.

After handling and bagging the spikes they were found to show no appreciable attrition. Several of the spikes were selected at random and driven into a clay soil with a mallet without any discernible fracturing or shattering.

All percents provided in this disclosure are weight percents unless specifically stated to be otherwise.

I claim:

1. A four-step method of preparing an attrition and shatter resistant fertilizer spike, exhibiting a shape and mechanical strength sufficient to allow the spike to be hammered unsupported into the soil without suffering damage, to provide a source of slow releasing plant nutrients to the soil, the method comprising:

(a) sizing particles of plant nutrient compounds, containing one phosphate ion chemically combined with one divalent cation and one monovalent cation, exhibiting a solubility of between 0.01 and 1.0 grams per 100 grams of water at 20° C., so that more than 80 percent of the particles exhibit diameters between 0.5 and 5.0 millimeters;

(b) mixing and rolling the sized particles; amounting to between 93 and 98 percent of the weight of the spike, in a coating device and spraying the particles with an aqueous emulsion or dispersion containing between 30 and 70 weight percent of a thermoplastic adhesive which provides adhesion to wet plant nutrients until the particles have been coated with thermoplastic adhesive amounting to between 2 and 7 percent, and free moisture amounting to between 1 and 7 percent of the weight of the spike, the thermoplastic adhesive being selected from the group consisting of vinylidene chloride, 2-ethylhexyl acrylate, acrylic acid, vinyl acetate, butadiene, natural rubber, and combinations thereof;

(c) injecting the coated particles into a spike shaped, die at a pressure between 600 and 4000 pounds per square inch, and a temperature greater than the softening temperature of the thermoplastic adhesive and between 50 and 200° C. to form the particles into a fertilizer spike exhibiting the shape and mechanical strength sufficient to allow hammering while unsupported into the soil without suffering damage; and (d) discharging the fertilizer spike from the die and cooling to a temperature less than the softening temperature of the thermoplastic adhesive.

2. The method of claim 1 wherein the particles of plant nutrient compounds are selected from the group consisting of magnesium ammonium phosphate, magnesium potassium phosphate, manganese ammonium phosphate, manganese potassium phosphate, zinc ammonium phosphate, ferrous ammonium phosphate, ferrous potassium phosphate, and mixtures thereof.

3. The method of claim 1 wherein the aqueous emulsion or dispersion contains between 40 and 60 weight percent of a thermoplastic adhesive selected form the group consisting of vinylidene chloride, 2-ethylhexyl acrylate, acrylic acid, vinyl acetate, butadiene, natural rubber, and combinations thereof.

4. The method of claim 1 wherein the particles are coated with thermoplastic adhesive amounting to between 2.8 and 3.0 weight percent.

5. The method of claim 1 wherein a liquid die lubricant exhibiting viscosities between 10 and 300 centipoise at 20° C., and amounting to between 0.1 and 0.5 weight percent, is added to the coated particles before injecting into the spike shaped die.

6. The method of claim 5 wherein the liquid die lubricant is selected from the group consisting of vegetable oils, mineral oils, lignin sulfonate solution, polyethylene glycols, and polyethylene glycol ethers.

7. The method of claim 1 wherein the spike shaped die consists of an orifice in a continuous extruder through which the coated particles are pressed to form strands which are cut into spike shapes.

8. The method of claim 1 wherein the spike shaped die consists of an indentation in a rotary roll compactor, the indentations being filled with the coated particles, compressed, and discharged as a spike.

9. A method of preparing an attrition and shatter resistant slow release fertilizer spike, which may be hammered into the soil without suffering damage, the method comprising:

(a) sizing granules of plant nutrient compound, magnesium ammonium phosphate or magnesium potassium phosphate, so that more than 80 percent of the particles exhibit diameters between 0.5 and 5.0 millimeters;

(b) mixing and rolling the sized granules, amounting to between 95 and 98 percent of the weight of the spike, in a coating device, and spraying onto the granules with an aqueous liquid, containing between 40 and 60 weight percent of a thermoplastic adhesive resin composed of about equal parts of vinylidene chloride, acrylic acid, and 2-ethylhexyl acrylate until the granules are coated with thermoplastic adhesive, amounting to between 2.8 and 3.2 weight percent and exhibiting a viscosity between 50 and 1500 centipoise at 20° C.;

(c) holding the coated granules at ambient temperature for a period of time between 1 and 24 hours to allow the thermoplastic adhesive to complete its adhesion to the granules of plant nutrients;

(d) admixing with the coated granules between 0.2 and 0.4 weight percent of a vegetable oil or mineral oil die lubricant exhibiting a viscosity between 20 and 150 centipoise at 20° C.;

(e) injecting the coated granules containing the die lubricant into a spike shaped die and there applying a pressure of between 1500 and 2500 pounds per square inch at temperatures between 90 and 120° C. to the granules to form them into a fertilizer spike exhibiting the shape and mechanical strength sufficient to be hammered unsupported into the soil without attrition or shattering; and (f) discharging the fertilizer spike from the spike shaped die and cooling to a temperature of less than 60° C.

10. An attrition and shatter resistant fertilizer spike composition exhibiting a mechanical strength which allows the spike to be hammered unsupported without damage into the soil to provide an effective source of slow releasing plant nutrients to the soil prepared by the method of claim 1, the composition comprising particles of plant nutrient compounds, amounting to between 93 and 98 percent of the weight of the spike, and containing one phosphate ion chemically combined with one divalent cation and one monovalent cation, exhibiting a solubility of between 0.01 and 1.0 grams per 100 grams of water at 20° C., the particles of plant nutrient compounds being coated with between 2 and 7 weight percent of a thermoplastic adhesive selected from the group consisting of vinylidene chloride, 2-ethylhexyl acrylate, acrylic acid, vinyl acetate, butadiene, natural rubber, and combinations thereof.

11. The composition of claim 10 wherein the particles of plant nutrient compounds containing one phosphate ion chemically combined with one divalent cation and one monovalent cation are selected from the group consisting of magnesium ammonium phosphate, magnesium potassium phosphate, manganese ammonium phosphate, manganese potassium phosphate, zinc ammonium phosphate, ferrous ammonium phosphate, and ferrous potassium phosphate.

12. The composition of claim 10 wherein plant micronutrients selected from the group consisting of iron humate, ferrous sulfate, zinc sulfate, manganous oxide, copper sulfate, and sodium borate are included as part of the particles of plant nutrient compounds in amounts between 0 and 10 percent.

* * * * *